US009299352B2

(12) United States Patent
Seo et al.

(10) Patent No.: US 9,299,352 B2
(45) Date of Patent: *Mar. 29, 2016

(54) METHOD AND APPARATUS FOR GENERATING SIDE INFORMATION BITSTREAM OF MULTI-OBJECT AUDIO SIGNAL

(75) Inventors: Jeong-Il Seo, Daejon (KR); Seung-Kwon Beack, Seoul (KR); Tae-Jin Lee, Daejon (KR); Yong-Ju Lee, Daejon (KR); Dae-Young Jang, Daejon (KR); Kyeongok Kang, Daejon (KR); Jin-Woo Hong, Daejon (KR); Jin-Woong Kim, Daejon (KR); Chieteuk Ahn, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 403 days.

This patent is subject to a terminal disclaimer.

(21) Appl. No.: 12/933,019

(22) PCT Filed: Mar. 30, 2009

(86) PCT No.: PCT/KR2009/001615

§ 371 (c)(1),
(2), (4) Date: Sep. 16, 2010

(87) PCT Pub. No.: WO2009/123409

PCT Pub. Date: Oct. 8, 2009

(65) Prior Publication Data

US 2011/0015770 A1 Jan. 20, 2011

(30) Foreign Application Priority Data

| | | |
|---|---|---|
| Mar. 31, 2008 | (KR) | 10-2008-0029562 |
| Apr. 14, 2008 | (KR) | 10-2008-0034161 |
| Mar. 23, 2009 | (KR) | 10-2009-0024374 |

(51) Int. Cl.
*G06F 17/00* (2006.01)
*G10L 19/008* (2013.01)

(52) U.S. Cl.
CPC .................................... *G10L 19/008* (2013.01)

(58) Field of Classification Search
CPC .................................................... G10L 19/008
USPC ........................................................... 700/94
See application file for complete search history.

(56) References Cited

U.S. PATENT DOCUMENTS 6,624,873 B1 * 9/2003 Callahan et al. ................ 352/27
7,692,087 B2 * 4/2010 Okazaki et al. ................. 84/600
(Continued)

FOREIGN PATENT DOCUMENTS

CN 1906971 1/2007
WO WO 2007004831 A1 * 1/2007 ............. G10L 19/00
(Continued)

OTHER PUBLICATIONS

WO2007/040354: Pang; published Apr. 12, 2007.*
(Continued)

*Primary Examiner* — Paul McCord
(74) *Attorney, Agent, or Firm* — NSIP Law

(57) ABSTRACT

Provided is a method and apparatus for generating a side information bitstream of a multi-object audio signal. The apparatus for generating a side information bitstream of a multi-object audio signal includes a spatial cue information input unit configured to receive spatial cue information generated in an encoder of the multi-object audio signal, a preset information input unit configured to receive preset information for the multi-object audio signal, and a side information bitstream generator configured to generate the side information bitstream based on the spatial cue information and the preset information. The side information bitstream includes a header region and a frame region, and the preset information is included in the frame region.

17 Claims, 3 Drawing Sheets

(56) References Cited

U.S. PATENT DOCUMENTS

| | | | | |
|---|---|---|---|---|
| 8,073,125 | B2 * | 12/2011 | Zhang et al. | 379/202.01 |
| 8,296,158 | B2 * | 10/2012 | Kim et al. | 704/500 |
| 2002/0026255 | A1 * | 2/2002 | Sueyoshi et al. | 700/94 |
| 2005/0147004 | A1 * | 7/2005 | Kumagai et al. | 369/47.19 |
| 2006/0174267 | A1 * | 8/2006 | Schmidt | 725/39 |
| 2006/0259168 | A1 * | 11/2006 | Geyersberger et al. | 700/94 |
| 2006/0280311 | A1 | 12/2006 | Beckinger et al. | |
| 2007/0269063 | A1 * | 11/2007 | Goodwin et al. | 381/310 |
| 2008/0004729 | A1 * | 1/2008 | Hiipakka | 700/94 |
| 2008/0049943 | A1 * | 2/2008 | Faller et al. | 381/17 |
| 2008/0192941 | A1 * | 8/2008 | Oh et al. | 381/17 |
| 2008/0205671 | A1 * | 8/2008 | Oh et al. | 381/119 |
| 2009/0125314 | A1 * | 5/2009 | Hellmuth et al. | 704/501 |
| 2009/0216542 | A1 * | 8/2009 | Pang et al. | 704/500 |
| 2010/0076772 | A1 * | 3/2010 | Kim et al. | 704/500 |
| 2010/0094631 | A1 * | 4/2010 | Engdegard et al. | 704/258 |
| 2010/0284549 | A1 * | 11/2010 | Oh et al. | 381/119 |
| 2011/0002469 | A1 * | 1/2011 | Ojala | 381/22 |
| 2011/0013790 | A1 * | 1/2011 | Hilpert et al. | 381/300 |
| 2011/0022402 | A1 * | 1/2011 | Engdegard et al. | 704/501 |

FOREIGN PATENT DOCUMENTS

| | | | |
|---|---|---|---|
| WO | 2007/089131 | A1 | 8/2007 |
| WO | 2007/091842 | A1 | 8/2007 |
| WO | 2007/091870 | A1 | 8/2007 |
| WO | WO 2007/091870 | | 8/2007 |
| WO | 2008/039045 | A1 | 4/2008 |
| WO | 2008/069593 | A1 | 6/2008 |
| WO | WO 2008/078973 | A1 | 7/2008 |
| WO | 2008/111770 | A1 | 9/2008 |

OTHER PUBLICATIONS

Mpeg surround specification; copyright 2006.*

International Search Report and Written Opinion for Application No. PCT/KR2009/001615, dated Sep. 11, 2009.

* cited by examiner

METHOD AND APPARATUS FOR GENERATING SIDE INFORMATION BITSTREAM OF MULTI-OBJECT AUDIO SIGNAL

RELATED APPLICATIONS

This application is a 35 U.S.C. §371 national stage filing of PCT Application No. PCT/KR2009/001615 filed on Mar. 30, 2009, which claims priority to, and the benefit of, Korean Patent Application No. 10-2008-0029562 filed on Mar. 31, 2008, Korean Patent Application No. 10-2008-0034161 filed on Apr. 14, 2008 and Korean Patent Application No. 10-2009-0024374 filed on Mar. 23, 2009. The contents of the aforementioned applications are hereby incorporated by reference.

TECHNICAL FIELD

The present invention relates to a method and apparatus for generating a side information bitstream of a multi-object audio signal.

This work was supported by the IT R&D program of MIC/IITA [2008-F-011-01, Developing Next Generation DTV Core Technology (Standardization Linkage), Developing Autostereoscopic Personal 3-D Broadcasting Technology (Continued)].

BACKGROUND ART

A conventional technology for encoding and decoding an audio signal does not combine different types of audio objects such as a mono-channel audio object, a stereo channel audio object, and a multi-channel audio object. That is, the conventional audio signal encoding and decoding technology did not allow a user to consume one type of audio contents in diverse ways. Accordingly, a user has passively consumed the audio contents.

A spatial audio coding (SAC) technology encodes a multi-channel audio signal into a down-mixed mono-channel signal or a down-mixed stereo channel signal with spatial cue information and transmits a high quality multi-channel signal even at a low bit rate. The SAC technology also analyzes an audio signal by each sub-band and restores an original multi-channel audio signal from the down-mixed mono-channel signal or the down-mixed stereo channel signal based on spatial cue information corresponding to each sub-band. The spatial cue information includes information for restoring an original signal in a decoding process and decides the quality of an audio signal to be reproduced in a SAC decoding apparatus. MPEG has been progressed the standardization of the SAC technology as MPEG Surround (MPS) and has used channel level difference as a main spatial cue.

Since the SAC technology allows encoding and decoding a multi-channel audio signal formed of only one audio object type, it is impossible to encode or decode an audio signal having various types of audio objects such as a mono-channel audio object, a stereo channel audio object, or a multi-channel audio object such as 5.1 channels using the SAC technology.

A binaural cue coding (BCC) technology according to the prior art was introduced to encode or decode a multi-object audio signal formed of mono-channel audio objects. However, a multi-object audio signal formed of multiple channel audio objects could not be encoded or decoded using the binaural cue coding BCC technology.

As described above, the conventional audio encoding and decoding technologies cannot be used to encode or decode a multi-object audio signal having multi-channel audio objects although a single object audio signal formed of multi-channel audio objects or a multi-object audio signal formed of mono-channel audio objects. Therefore, a plurality of different channel audio objects cannot be combined based on the conventional audio encoding and decoding technologies. That is, a user could not consume one type of audio contents in various ways. The conventional audio encoding and decoding technology allows a user only to passively consume audio contents.

DISCLOSURE

Technical Problem

An embodiment of the present invention is directed to providing a method and apparatus for changing audio scene information set-up (ex. Preset) according to the intention of a sound engineer or an editor while reproducing a multi-object audio signal by including preset information in a frame region of the side information bitstream that is generated when the multi-object audio signal is encoded.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an apparatus for generating a side information bitstream of a multi-object audio signal, including a spatial cue information input unit configured to receive spatial cue information generated in an encoder of the multi-object audio signal, a preset information input unit configured to receive preset information for the multi-object audio signal, and a side information bitstream generator configured to generate the side information bitstream based on the spatial cue information and the preset information, wherein the side information bitstream includes a header region and a frame region, and the preset information is included in the frame region.

In accordance with another aspect of the present invention, there is provided an apparatus for analyzing a side information bitstream of a multi-object audio signal, including a side information bitstream input unit configured to receive the side information bitstream, a spatial cue information extractor configured to extract spatial cue information based on the side information bitstream, and a preset information extractor configured to extract preset information based on the side information bitstream, wherein the side information bitstream includes a header region and a frame region, and the preset information is included in the frame region.

In accordance with another aspect of the present invention, there is provided an apparatus for encoding a multi-object audio signal, including an encoder configured to down-mix an audio signal formed of a plurality of objects and generate spatial cue information for an audio signal formed of the plurality of objects, and a side bitstream generator configured to generate a side information bitstream based on preset information for the spatial cue information and the audio signal, wherein the side information bitstream includes a header region and a frame region, and the preset information is included in the frame region.

In accordance with another aspect of the present invention, there is provided an apparatus for decoding a multi-object audio signal, including a side information bitstream analyzer configured to receive a side information bitstream and extract spatial cue information and preset information included in the side information bitstream, a decoder configured to restore an audio signal formed of a plurality of audio objects based on the spatial cue information from an input down-mixed audio signal, and a renderer configured to render an audio signal formed of the plurality of objects into an audio signal formed of a plurality of channels based on the preset information, wherein the side information bitstream includes a header region and a frame region, and the preset information is included in the frame region.

In accordance with another aspect of the present invention, there is provided a method for generating a side information bitstream of a multi-object audio signal, including receiving spatial cue information generated in an encoder of the multi-object audio signal, receiving preset information of the multi-object audio signal, and generating the side information bitstream based on the spatial cue information and the preset information, wherein the side information bitstream includes a header region and a frame region, and the preset information is included in the frame region.

In accordance with another aspect of the present invention, there is provided a method for analyzing a side information bitstream of a multi-object audio signal, including receiving the side information bitstream, extracting spatial cue information based on the side information bitstream, and extracting preset information based on the side information bitstream, wherein the side information bitstream includes a header region and a frame region, and the preset information is included in the frame region.

In accordance with another aspect of the present invention, there is provided a method for encoding a multi-object audio signal, including: down-mixing an audio signal formed of a plurality of objects and generating spatial cue information for an audio signal formed of a plurality of objects, and generating a side information bitstream based on preset information for the spatial cue information and the audio signal, wherein the side information bitstream includes a header region and a frame region, and the preset information is included in the frame region.

In accordance with another aspect of the present invention, there is provided a method for decoding a multi-object audio signal, including: receiving a side information bitstream and extracting spatial cue information and preset information included in the side bitstream; restoring an audio signal formed of a plurality of objects based on the spatial cue information from an input down-mixed audio signal; and rendering the audio signal formed of the plurality of objects to an audio signal formed of a plurality of channels based on the preset information, wherein the side information bitstream includes a header region and a frame region, and the preset information is included in the frame region.

Advantageous Effects

A method and apparatus for generating a side information bitstream of a multi-object audio signal according to an embodiment of the present invention advantageously enables changing audio scene information set up according to the intention of an editor or a sound engineer while reproducing a multi-object audio signal by including preset information in a frame region of a side information bitstream generated when a multi-object audio signal is encoded.

BEST MODE FOR THE INVENTION

Figure 1:
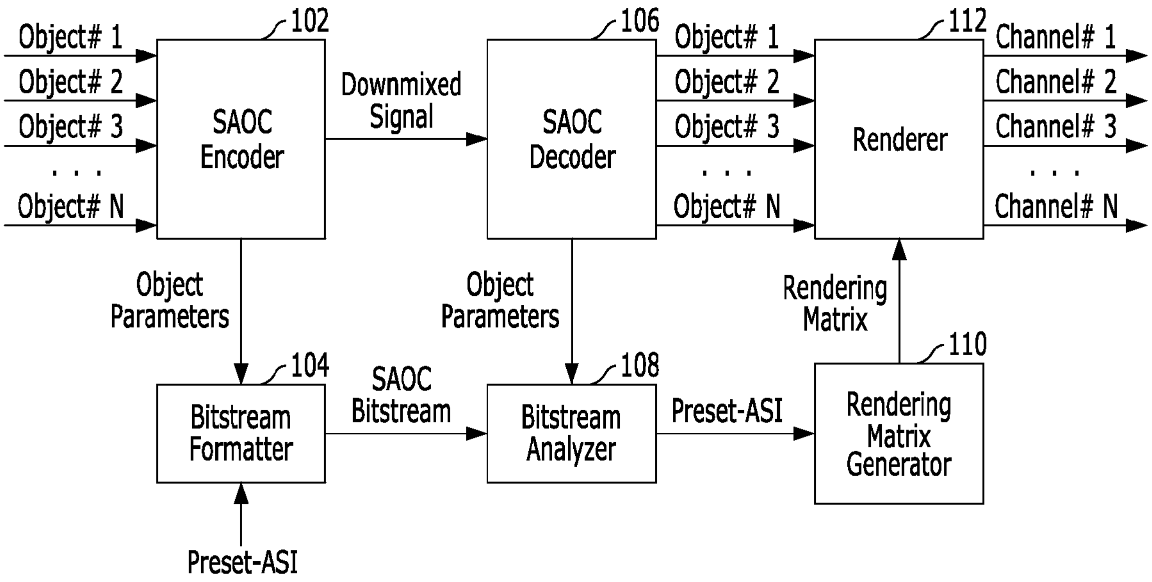
FIG. 1 is a diagram describing encoding, decoding, and rendering a multi-object audio signal in accordance with an embodiment of the present invention.

The advantages, features and aspects of the invention will become apparent from the following description of the embodiments with reference to the accompanying drawings, which is set forth hereinafter. When it is considered detailed description on a prior art may obscure a point of the present invention, the description will not be provided herein.

The present invention relates a technology for compressing and decompressing a multi-channel/multi-object audio signal. Multi-object audio encoding is a technology for compressing different audio objects together and transmitting the compressed audio objects. The multi-object audio encoding technology was developed based on a spatial audio coding (SAC) technology.

In a process of decoding a multi-object audio signal, an input audio signal formed of multi-objects is down-mixed and transmitted to a decoding apparatus. Here, a side information bitstream is transmitted with the down-mixed signal. The side information bitstream includes information necessary to reproduce a multi-object audio signal. The information for reproducing a multi-object audio signal includes preset audio scene information (Preset-ASI). Audiences of a multi-object audio signal can enjoy various audio scenes using the preset information that is set up by and provided from an editor or a sound engineer.

The side information bitstream is divided into a header region and a frame region. The preset information is only included in the header region. Accordingly, an audience is provided with only default preset information stored in the header region. After providing the default preset information, it is impossible to update the preset information.

In order to overcome the problem, an embodiment of the present invention provides a technology for providing realistic audio scenes to audiences by updating the preset information while reproducing a multi-object audio signal. In order to update the preset information, a method and apparatus for generating a side information bitstream according to the present invention includes the preset information in a frame region of the sub information bitstream. That is, a method and apparatus for generating a side information bitstream according to the present invention enables an audience to receive not only default preset information included in a header region but also optional preset information included in each frame by including the preset information in the frame region and transmitting the preset information with the frame region.

For example, a chorus sound source is located at the front of a stage with a main vocal sound source when a corresponding audio signal is initially reproduced. Updated preset information may relocate the chorus sound source to the rear of the stage at a predetermined time during reproducing the audio signal. As another example, it is possible to move a location of a chorus sound source from the front of a stage or the rear of the stage according to time during reproducing the audio signal. The method and apparatus for generating a side information bitstream according to the present invention can improve a sound field of an audio signal or form a dynamic sound scene.

Hereinafter, a method and apparatus for generating a side information bitstream according to the present invention will be described with reference to the accompanying drawings. Like numeral references denote like elements throughout the accompanying drawings.

FIG. 1 is a diagram for describing encoding, decoding, and rendering a multi-object audio signal in accordance with an embodiment of the present invention.

Referring to FIG. 1, a multi-object audio signal is encoded, decoded, and rendered through a SAOC encoder 102, a bitstream formatter 104, a SAOC decoder 106, a bitstream analyzer 108, a rendering matrix generator 110, and a renderer 112 according to the present embodiment.

In multi-object spatial audio object coding (SAOC), a signal inputted as an audio object is encoded. Each of audio objects is restored by a decoder. The restored objects are not independently reproduced. The restored objects are rendered based on information about audio objects for forming a specific audio scene and outputted as a multi-object audio signal. Therefore, it is necessary to have an apparatus for rendering information about input audio objects in order to obtain a predetermined audio scene based on a multi-object audio signal.

The SAOC encoder 102 is a spatial cue based encoder and encodes an input audio signal as an audio object. Here, the audio object inputted to the SAOC encoder 102 may be a mono-channel audio signal or a stereo channel audio signal. The SAOC encoder 102 outputs a down-mixed signal by encoding more than one audio object. The outputted down-mixed signal may be a mono signal or a stereo signal. The SAOC encoder 102 extracts spatial cue parameters related to multi-object necessary to decode the down-mixed signal. The SAOC encoder 102 may analyze an input audio object signal based on a Heterogeneous Layout SAOC scheme or a Faller scheme.

The extracted spatial cue parameter includes spatial cue information. The spatial cue is analyzed and extracted by a unit of a frequency domain sub-band. The spatial cue is information used for encoding and decoding an audio signal. The spatial cue is extracted from a frequency domain and includes information about amplitude different, delay difference, and correlation between two signals. For example, the spatial cue includes channel level difference (CLD), inter-channel level difference (ICLD), inter channel time difference (ICTD), inter channel correlation (ICC), and virtual source location information. However, the present invention is not limited thereto.

The spatial cue parameter includes information for restoring and controlling spatial cue and an audio signal. Particularly, header information included in a spatial cue parameter includes information for restoring and reproducing a multi-object audio signal formed of various channel type audio objects and defines channel information about an audio object and an ID of a corresponding audio object, thereby providing decoding information about mono-channel audio objects, stereo channel audio objects, and multi-channel audio objects. For example, the header information may include information of Identification (ID) or an object that enables identifying whether a coded audio object is a mono-channel audio signal or a stereo channel audio signal.

The bitstream formatter 104 generates a side information bitstream (SAOC bitstream) based on preset information (Preset-ASI) from an external device and the spatial cue parameters transferred from the SAOC encoder 102.

The SAOC decoder 106 restores the down-mixed signal from the SAOC encoder 102 as a multi-object audio signal using the spatial cue parameter outputted from the bitstream analyzer 108. The SAOC decoder 106 may be replaced with a MPEG surround decoder and a BCC decoder.

The bitstream analyzer 108 extracts spatial cue parameters and preset information by analyzing the side information bitstream outputted from the bitstream formatter 104. The extracted spatial cue parameters are transferred to the SAOC decoder 106, and the preset information is transferred to a rendering matrix generator 110.

The rendering matrix generator 110 generates a rendering matrix using the preset information outputted from the bitstream analyzer 108 and user control inputted from an external device. If the preset information is not transmitted from the bitstream analyzer 108, the preset information is set up as default.

The renderer 112 renders a multi-object audio signal outputted from the SAOC decoder 106 to a multi-channel audio signal using the rendered matrix outputted from the rendering matrix generator 110.

Although encoding, decoding, and rendering the multi-object audio signal according to the present embodiment were described with reference to FIG. 1, the side information bitstream according to the present invention is not limited thereto. That is, the present invention may be identically applied to any structures for rendering multi-object signals based on preset information included in audio object signal.

Figure 2:
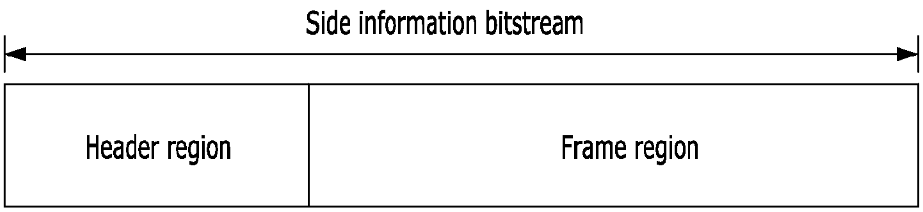
FIG. 2 illustrates a structure of a side information bitstream generated using a multi-object audio signal.

FIG. 2 is a diagram for describing a structure of a side information bitstream generated using a multi-object audio signal.

As shown in FIG. 2, the side information bitstream includes a header region and a frame region. The header region includes header information, channel information of an audio object, ID information of a corresponding audio object, the number of audio objects by a channel. The frame region includes information about a real audio signal, for example, spatial cue information.

The preset information means audio object control information and speaker layout information. In more detail, the preset information includes speaker layout information, audio object location information, and level information in order to properly produce an audio scene. The preset information may be directly expressed or expressed in a matrix formation.

When the preset information is directly expressed, the preset information may include information about a layout of a playback system such as a mono system, a stereo system, and a multi-channel system, an audio object ID, an audio object layout (mono or stereo), an audio object location, azimuth such as 0 degree to 360 degree, elevation such as −50 degree to 90 degree, and an audio object level such as −50 dB to 50 dB.

When the preset information is expressed in a matrix formation, the preset information may have a form of a P matrix as shown in Eq. 1. The preset information expressed in the matrix includes power gain information to be mapped to an output channel or phase information as element vectors.

$$P \odot W_{oj}^{b} = \underbrace{\begin{bmatrix} p_{1,1}^{b} & p_{1,2}^{b} & \cdots & p_{1,N-1}^{b} \\ p_{2,1}^{b} & p_{2,2}^{b} & \cdots & p_{2,N-1}^{b} \\ \vdots & \vdots & \ddots & \vdots \\ p_{M,1}^{b} & p_{M,2}^{b} & \cdots & p_{M,N-1}^{b} \end{bmatrix}}_{Matrix\ I} \odot \begin{bmatrix} w_{oj\_1}^{b} \\ w_{oj\_2}^{b} \\ \vdots \\ w_{oj\_N-1}^{b} \end{bmatrix} = \begin{bmatrix} w_{ch\_1}^{b} \\ w_{ch\_2}^{b} \\ \vdots \\ w_{ch\_M}^{b} \end{bmatrix}_{SAOC} \quad \text{Eq. 1}$$

The preset information may define diverse audio scenes of the same audio content to be proper to different reproducing scenarios. For example, a plurality of preset information set up for stereo or multichannel playback systems such as 5.1 channel and 7.1 channel playback systems can be generated to be proper to the objective of a playback service or the intention of a contents producer. A user may select one of audio scene information among more than one audio scene information (ASI) included in the preset information. The selected audio scene information is used to render a multi-object audio signal of corresponding audio contents.

The side information bitstream includes preset information for rendering a multi-object audio signal. Such preset information was not included in a frame region according to the prior art. The preset information was conventionally included in a header region only. Therefore, a user or an audience was limitedly enabled to enjoy a multi-object audio signal only using default preset information included in the header region.

Figure 3:
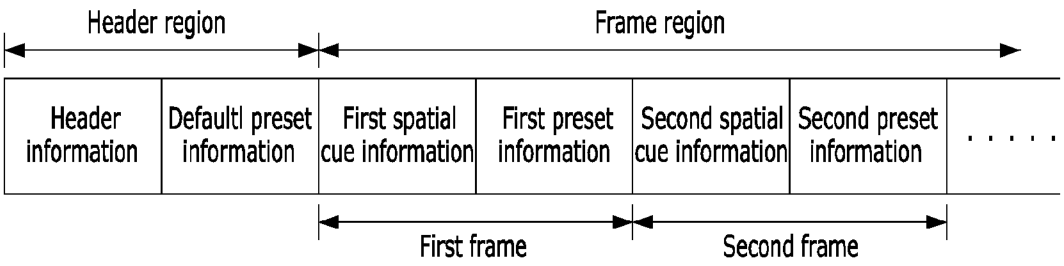
FIG. 3 illustrates a structure of a side information bitstream in accordance with an embodiment of the present invention.

FIG. 3 illustrates a structure of a side information bitstream in accordance with an embodiment of the present invention.

Referring back to FIG. 2, the default preset information is included in the header region only in the prior art. Therefore, it is impossible to provide diverse preset information set up properly to an environment varying during reproducing an audio signal or set up properly the multiple intentions of a contents producer, an editor, or a sound engineer. In order to overcome such a shortcoming, the side information bitstream according to the present embodiment includes preset information not only in a header region but also in a frame region. Therefore, the side information bitstream according to the present embodiment enables providing preset information different from the default preset information included in a header region at a predetermined time point (or frame) while reproducing a multi-object image.

Referring to FIG. 3, a side information bitstream according to the present embodiment includes a header region and a frame region. The header region includes header information and default preset information. Since the header information was already described in detail, detail description thereof is omitted. The default preset information may be provided to a user at an initial stage of reproducing a multi-object audio signal.

The frame region includes more than one frame. As shown in FIG. 3, the frame region includes a first frame, a second frame, . . . , and an $n^{th}$ frame. Each of the frames may include a plurality of information. FIG. 3 shows the frame region including spatial cue information and preset information for convenience. As shown in FIG. 3, a first frame may include not only first spatial cue information but also first preset information. Similarly, the second frame includes second spatial cue information with second preset information.

By allocating a space in each frame to include preset information, it is possible to provide preset information of a corresponding frame while reproducing a multi-object audio signal. For example, the bitstream analyzer 108 of FIG. 1 sequentially analyzes a side information bitstream from the bitstream formatter 104. The bitstream analyzer 108 extracts default preset information by analyzing the header region and continuously extracts preset information included in a frame region by analyzing the frame region. The bitstream analyzer 108 transmits the extracted preset information to the rendering matrix generator 110. Therefore, the bitstream analyzer 108 according to the present embodiment can extract new preset information whenever the bitstream analyzer 108 analyzes each frame region and uses the extracted new preset information to render a multi-object audio signal corresponding to a corresponding frame.

The preset information can be used in various ways by providing the preset information by each frame. For example, if a frame including new preset information is received while rendering each frame based on the default preset information of the header region at an initial stage of reproducing a corresponding audio signal, the new preset information may be applied only to render the corresponding frame or the new preset information may be applied for rendering remaining frames.

If another frame including different preset information is received after applying the new preset information, the preset information of the newly received frame will be applied to a corresponding frame. As a method of using the default preset information included in the header region, it is possible to provide various preset information to a user by providing all of the default preset information of the header region and the new preset information included in corresponding frames.

Figure 4:
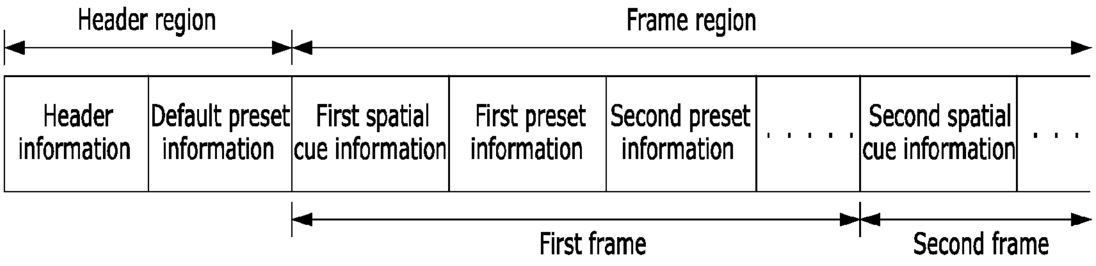
FIG. 4 illustrates a structure of a side information bitstream in accordance with another embodiment of the present invention.

FIG. 4 is a diagram illustrating a structure of a side information bitstream in accordance with another embodiment of the present invention.

Referring to FIG. 4, the side information bitstream includes a header region and a frame region. The header region includes header information and default preset information. The frame region includes more than one frame such as a first frame, a second frame, . . . , and a $n^{th}$ frame.

In FIG. 4, the first frame includes a plurality of preset information such as first preset information and second preset information. According to the side information bitstream according to the present embodiment, a user receives more various preset information at a period corresponding to the first frame than any other period by including a plurality of preset information in one frame as shown in FIG. 4.

Although not shown in FIG. 4, the second frame may also have a plurality of preset information like the first frame. Or, the second frame may not include any preset information.

Although it is not shown in FIG. 4, it is possible to include preset information into each frame in regular pattern. For example, the first frame includes three preset information, the second frame includes no preset information, the third frame includes three frames again, and the fourth frame includes no preset information.

In addition, it is possible to include preset information only into a particular frame region as shown in FIG. 4. Furthermore, more than one frame may be included in the frame region based on various applicable patterns.

By setting various regions to include preset information by each frame as described above, it is possible to provide various audio scene information about a multi-object audio signal corresponding to each frame.

Figure 5:
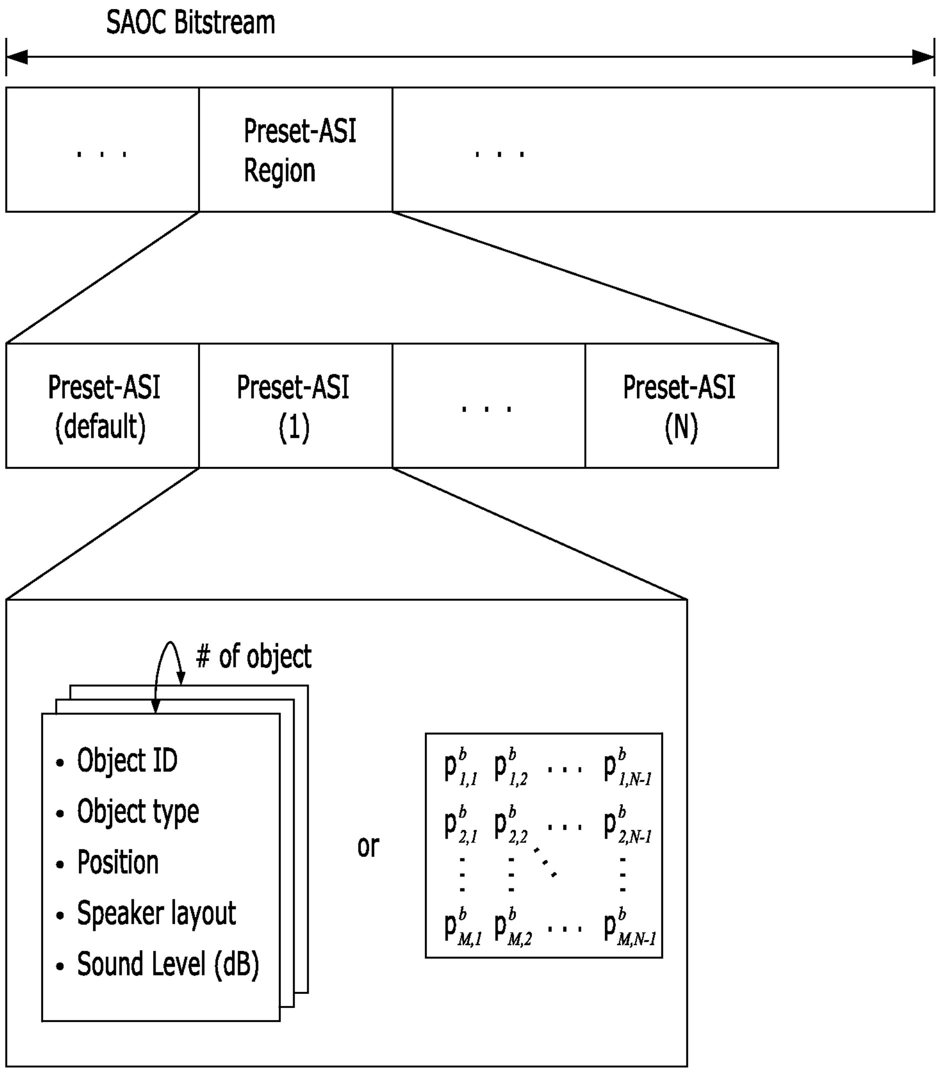
FIG. 5 illustrates a structure of a side information bitstream in accordance with still another embodiment of the present invention.

FIG. 5 is a diagram illustrating a structure of a side information bitstream in accordance with another embodiment of the present invention.

Referring to FIG. 5, the side information bitstream (SAOC bitstream) includes a preset information region. (Preset-ASI region). The preset information region includes a plurality of preset information such as Preset-ASI (default), Preset-ASI (1) to (N). One preset information includes audio object control information and speaker layout information. As described above, the preset information may be directly expressed or expressed in a matrix formation. In case of directly expressing, the preset information includes an object ID, an object type, a location, a speaker layout, and sound level information as many as the number of objects. As shown in FIG. 5, the preset information may be expressed in a matrix having such elements as element vectors.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean Patent Application No. 2008-0029562, filed in the Korean Intellectual Property Office on Mar. 31, 2008, and Korean Patent Application No. 2008-0034161, filed in the Korean Intellectual Property Office on Apr. 14, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. An apparatus for generating a side information bitstream of a multi-object audio signal, comprising:

a spatial cue information input unit configured to receive spatial cue information generated in an encoder of the multi-object audio signal;

a preset information input unit configured to receive preset information for the multi-object audio signal; and a side information bitstream generator configured to generate the side information bitstream based on the spatial cue information and the preset information, wherein the side information bitstream includes a frame region, wherein the frame region includes the preset information for rendering a multi-object audio signal corresponding to a frame wherein the preset information includes (i) a layout of a playback system for a mono system, a stereo system and multi-channel system, (ii) an audio object ID, (iii) object location, (iv) object level and (v) an azimuth degree and an elevation degree of the object, wherein the preset information is used to define audio scene for rendering a multi-object audio signal.

2. The apparatus of claim 1, wherein the frame region includes one or more frames and at least one of the frames includes one or more preset information.

3. The apparatus of claim 1, wherein at least one of the preset information is used to render a multi-object audio signal corresponding to the frame region.

4. An apparatus for analyzing a side information bitstream of a multi-object audio signal, comprising:

a side information bitstream input unit configured to receive the side information bitstream;

a spatial cue information extractor configured to extract spatial cue information based on the side information bitstream; and a preset information extractor configured to extract preset information from a frame region of the side information bitstream, wherein the side information bitstream includes the frame region, wherein the preset information includes: (i) a layout of a playback system for a mono system, a stereo system and multi-channel system, (ii) an audio object ID, (iii) object location, (iv) object level and (v) an azimuth degree and an elevation degree of the object, wherein the preset information is used to define audio scene for rendering a multi-object audio signal.

5. The apparatus of claim 4, wherein the frame region includes one or more frames and at least one of the frames includes one or more preset information.

6. The apparatus of claim 4, wherein at least one of the preset information is used to render a multi-object audio signal corresponding to the frame region.

7. An apparatus for encoding a multi-object audio signal, comprising:

an encoder configured to down-mix an audio signal formed of a plurality of objects and generate spatial cue information for the audio signal formed of the plurality of objects; and a side information bitstream generator configured to generate a side information bitstream based on preset information for the spatial cue information and the audio signal, wherein the side information bitstream includes a frame region, wherein the frame region includes the preset information for rendering a multi-object audio signal corresponding to a frame, wherein the preset information includes (i) a layout of a playback system for a mono system, a stereo system and multi-channel system, (ii) an audio object ID, (iii) object location, (iv) object level and (v) an azimuth degree and an elevation degree of the object, wherein the preset information is used to define audio scene for rendering a multi-object audio signal.

8. An apparatus for decoding a multi-object audio signal, comprising:

aside information bitstream analyzer configured to receive a side information bitstream and extract spatial cue information and preset information included in a frame region of the side information bitstream, wherein the side information bitstream includes the frame region;

a decoder configured to restore an audio signal formed of a plurality of audio objects based on the spatial cue information from an input down-mixed audio signal; and a renderer configured to render an audio signal formed of the plurality of objects into an audio signal formed of a plurality of channels based on the preset information, wherein the frame region includes the preset information for rendering a multi-object audio signal corresponding to a frame, wherein the preset information includes (i) a layout of a playback system for a mono system, a stereo system and multi-channel system, (ii) an audio object ID, (iii) object location, (iv) object level and (v) an azimuth degree and an elevation degree of the object, wherein the preset information is used to define audio scene for rendering a multi-object audio signal.

9. A method for generating a side information bitstream of a multi-object audio signal, comprising:

receiving spatial cue information generated in an encoder of the multi-object audio signal;

receiving preset information of the multi-object audio signal; and generating the side information bitstream based on the spatial cue information and the preset information, wherein the side information bitstream includes a frame region, wherein the frame region includes the preset information for rendering a multi-object audio signal corresponding to a frame, wherein the preset information includes (i) a layout of a playback system for a mono system, a stereo system and multi-channel system, (ii) an audio object ID, (iii) object location, (iv) object level and (v) an azimuth degree and an elevation degree of the object, wherein the preset information is used to define audio scene for rendering a multi-object audio signal.

10. The method of claim 9, wherein the frame region includes one or more frames and at least one of the frames includes one or more preset information.

11. The method of claim 9, wherein at least one of the preset information is used to render a multi-object audio signal corresponding to the frame region.

12. A method for analyzing a side information bitstream of a multi-object audio signal, comprising:

receiving the side information bitstream; and extracting preset information from a frame region of the side information bitstream, wherein the side information bitstream includes the frame region, wherein the frame region includes the preset information for rendering a multi-object audio signal corresponding to a frame, wherein the preset information includes (i) a layout of a playback system for a mono system, a stereo system and multi-channel system, (ii) an audio object ID, (iii) object location, (iv) object level and (v) an azimuth degree and an elevation degree of the object, wherein the preset information is used to define audio scene for rendering a multi-object audio signal.

13. The method of claim 12, wherein the frame region includes one or more frames and at least one of the frames includes one or more preset information.

14. The method of claim 12, wherein at least one of the preset information is used to render a multi-object audio signal corresponding to the frame region.

15. A method for encoding a multi-object audio signal, comprising:

down-mixing an audio signal formed of a plurality of objects and generating spatial cue information for the audio signal formed of a plurality of objects; and generating a side information bitstream based on preset information for the spatial cue information and the audio signal, wherein the side information bitstream includes a frame region, wherein the frame region includes the preset information for rendering a multi-object audio signal corresponding to a frame, wherein the preset information includes (i) a layout of a playback system for a mono system, a stereo system and multi-channel system, (ii) an audio object ID, (iii) object location, (iv) object level and (v) an azimuth degree and an elevation degree of the object, wherein the preset information is used to define audio scene for rendering a multi-object audio signal.

16. A method for decoding a multi-object audio signal, comprising:

receiving a down-mixed signal of a plurality of objects, and a bitstream;

extracting a preset information from the bitstream;

generating channel signal using the down-mixed signal and information based on a rendering matrix and the preset information; and outputting the channel signal wherein the bitstream includes frame region stored the preset information, wherein the channel signal corresponds to one of mono signal, stereo signal or multi-channel, wherein the preset information includes (i) a layout of a playback system for a mono system, a stereo system and multi-channel system, (ii) an audio object ID, (iii) object location, (iv) object level and (v) an azimuth degree and an elevation degree of the object, wherein the preset information is used to define audio scene for rendering a multi-object audio signal.

17. An apparatus for decoding an encoded multi-object audio signal, wherein the encoded multi-object audio signal is a down-mixed signal, comprising:

a side information bitstream controller configured to extract a preset information included in a bitstream; and a decoder configured to generate channel signal using the down-mixed signal and information based on a rendering matrix and the preset information, wherein the bitstream includes a frame region stored the preset information, wherein the frame region includes the preset information for rendering a multi-object audio signal corresponding to a frame, wherein the preset information includes (i) a layout of a playback system for a mono system, a stereo system and multi-channel system, (ii) an audio object ID, (iii) object location, (iv) object level and (v) an azimuth degree and an elevation degree of the object, wherein the preset information is used to define audio scene for rendering a multi-object audio signal.

* * * * *